(12) United States Patent
Herpst

(10) Patent No.: US 6,270,222 B1
(45) Date of Patent: *Aug. 7, 2001

(54) PROTECTIVE WINDOW ASSEMBLY AND METHOD OF USING THE SAME FOR A LASER BEAM GENERATING APPARATUS

(76) Inventor: Robert D. Herpst, 11 Trotters La., Mahwah, NJ (US) 07430

( * ) Notice: Subject to any disclaimer, the term of this patent is extended or adjusted under 35 U.S.C. 154(b) by 0 days.

This patent is subject to a terminal disclaimer.

(21) Appl. No.: 09/288,709

(22) Filed: Apr. 9, 1999

Related U.S. Application Data

(63) Continuation-in-part of application No. 08/880,663, filed on Jun. 23, 1997, now Pat. No. 5,898,522, which is a continuation-in-part of application No. 08/668,384, filed on Jun. 21, 1996, now abandoned, which is a continuation-in-part of application No. 08/540,561, filed on Oct. 6, 1995, now abandoned.

(51) Int. Cl.$^7$ ............................. G03B 11/04; G02B 7/02
(52) U.S. Cl. ......................... 359/511; 359/509; 359/819
(58) Field of Search ................... 359/507–511, 808–811, 359/819, 827, 894; 372/58, 61, 98, 101, 109

(56) References Cited

U.S. PATENT DOCUMENTS

| 3,569,660 | * | 3/1971 | Houldcroft | 359/509 |
| 3,604,890 | * | 9/1971 | Mullaney | 359/509 |
| 5,898,522 | * | 4/1999 | Herpst | 359/511 |

* cited by examiner

Primary Examiner—Thong Nguyen
(74) Attorney, Agent, or Firm—Roger M. Rathbun

(57) ABSTRACT

A protective window assembly and its use with a focusing assembly lens in a laser beam generating apparatus, the protective window assembly contains a window with apertures for protecting the focusing lens against damaging and cooling the focusing lens.

8 Claims, 10 Drawing Sheets

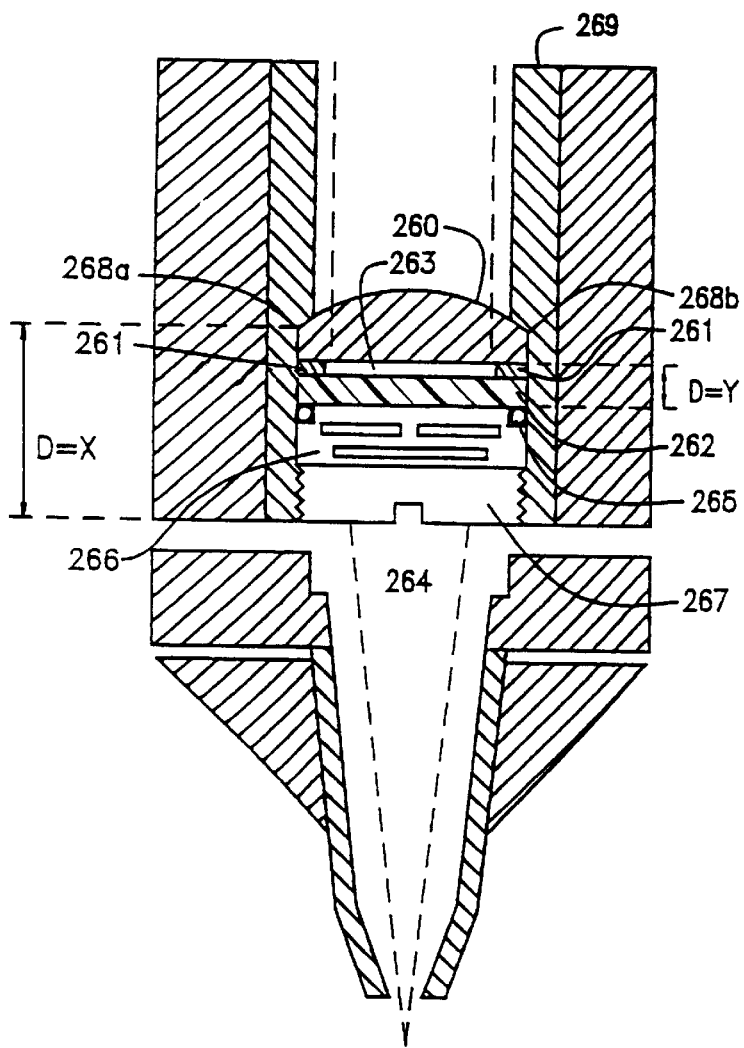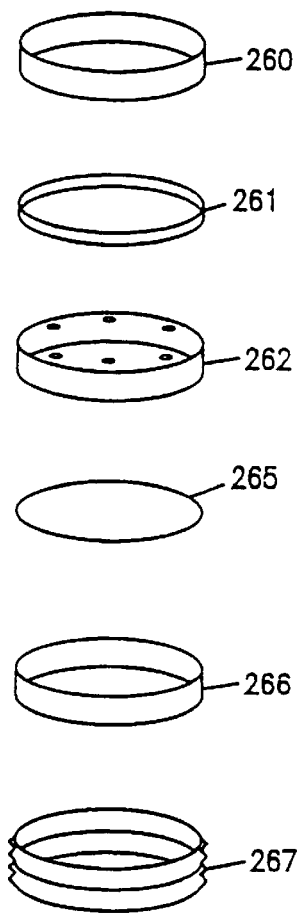
FIG. 12
FIG. 13

PROTECTIVE WINDOW ASSEMBLY AND METHOD OF USING THE SAME FOR A LASER BEAM GENERATING APPARATUS

RELATED APPLICATION

This is a Continuation-In-Part Application of U.S. Ser. No. 08/880,663 filed on Jun. 23, 1997, now U.S. Pat. No. 5,898,522, which is a Continuation-In-Part Application of U.S. Ser. No. 08/668,384 filed Jun. 21, 1996, now abandoned, which is a Continuation-In-Part Application of U.S. Ser. No.08/540,561 filed Oct. 6, 1995, now abandoned.

FIELD OF THE INVENTION

The present invention is directed to a protective window assembly for use in conjunction with or integral with a focusing lens assembly in a laser beam generating apparatus in which a protective window is provided for protecting the focusing lens and especially any lens coating thereon against contamination. The protective window is situated within a single housing containing the focusing lens or in a separate housing which is operatively secured to an assembly containing the focusing lens.

BACKGROUND OF THE INVENTION

Lasers are a common and important mechanism for cutting, marking, welding, and surface modifying substrates such as metals including stainless steel. The term "Laser" is an acronym for Light Amplification by Stimulated Emission of Radiation. The most common,stimulating media are carbon dioxide gas and neodymium yttrium aluminum garnet (Nd:YAG).

Maximizing laser productivity depends on output power, laser beam quality, and ease of operation of the device for its intended purpose. One of the more common reasons for poor laser performance is the result of contamination of the laser apparatus, particularly the focusing lens. Sources of laser contamination include impurities in the laser gases or in the nozzle pressurizing gas, vacuum-system leaks, back-streaming of vacuum pump oil into the laser cavity, sputtering of metal atoms from electrodes, fingerprints and vacuum grease, and contaminants present where optics are stored, and the like.

Many laser systems use some type of nozzle in front of the final focusing lens. The nozzle delivers a pressurized gas to the workpiece and is designed to prevent debris from spraying onto the focusing lens. Contamination of the focusing lens is one of the prime reasons for poor laser performance and downtime of laser operations. However, no nozzle system is perfect and some debris, fume or backspatter will occasionally reach the lens.

More recently laser systems have employed a protective window to protect the focusing lens against contamination. The protective window is positioned in front of the focusing lens and both optics are contained within a lens assembly. This system is disadvantageous because the protective window requires modification or disassembly of the lens assembly to replace or renew the protective window which can alter the focal length of the laser beam. Such a system is frequently impractical because the lens holder is not designed to accommodate a protective window.

Lasers are a widely used means for cutting steel, stainless steel, aluminum, titanium, plastic wood and other substances. They are also used for welding. In many cutting applications high pressure gas, known as assist gas, is used to aid in the cutting process. Oxygen under pressure is used to cut carbon or mild steel. Nitrogen assist gas is commonly used to cut stainless steel and argon and helium are used to cut titanium. Gases used to cut substances other than mild steel tend to be used under higher pressures than oxygen used to cut mild steel. The assist gases perform various functions depending upon the material being cut.

Oxygen reacts with the iron in mild steel and releases energy which causes more rapid melting of the steel than the laser alone would cause at the same power level. The reaction of oxygen with iron effectively doubles the energy Output of the laser. Stainless steel is cut with inert assist gas because oxygen cutting leaves an undesirable dark adherent scale on the surface and produces rough edges on thicker pieces. Due to the absence of the oxygen-iron reaction, higher power must be used to cut stainless steel.

The high viscosity of stainless steel melted by $CO_2$ laser cutting causes dross adherence to the bottom edge of the material. To solve this problem, assist gases under very high gas pressures are blown through the kerf to drive off the dross. Assist gases may also be used to blow the "spatter" generated by the cutting process away from the laser's focusing lens and for cooling the focusing lens. Assist gas is introduced to the cutting area through the cutting head of the laser and is delivered to the cutting area by the same nozzle through which the laser beam passes. When the assist gas is introduced into the cutting head it is in the same chamber in which the focusing lens is situated and the gas therefore applies pressure to the lens.

The smoke and steel particles arising out of $CO_2$ laser cutting and welding processes are known as "spatter". Spatter can damage a laser focusing lens or the anti-reflective coating that is deposited on the lens to enhance the transmission of energy through the lens. Spatter tends to be small particles which adhere to the focusing lens or the anti-reflective coating on the lens. Spatter can burn and pit the lens and the coating. The energy that a focusing lens transmits decreases as spatter damage and contamination build up on the lens, until the point is reached that insufficient energy is transmitted to the focal point of the laser for the efficient cutting to continue. At that point the lens must be replaced. $CO_2$ laser focusing lenses are quite expensive. If the lens is not replaced, it begins to absorb excessive amounts of energy which causes overheating and can melt the lens. If the lens melts, the expensive internal optical components of the laser are exposed to contamination which can ruin them.

Many laser cutting systems which employ assist gases also use the assist gases to cool the focusing lens.

Recently, users of certain $CO_2$ laser systems have employed protective windows in front of the focusing lens to protect the focusing lens from spatter. These protective windows are normally added by the user and, to date, no means of using them is provided by any $CO_2$ laser system manufacturer for cutting applications which employ gas under high pressure. However, users with systems with sufficient room in the focusing lens mount have placed protective windows in front of the lens with limited success. Many users have laser systems in which the lens mount will not accommodate a protective window unless the focusing lens is moved. But, moving the lens alters the focal point of the laser beam. If the system does not provide the focusing flexibility to accommodate movement of the focusing lens or if there is not sufficient room in the lens mount for another optic, then the protective window cannot be inserted without some modification or addition to the lens mount that will accommodate a protective window. For this reason many users of laser welding and cutting systems have been prevented from using protective windows.

NaCl and KCl are the materials that are most practical to use as protective windows. Unfortunately, protective windows made from these materials will break under pressure. Accordingly, the use of protective windows has been largely confined to $CO_2$ laser welding systems where assist gases are not used and pressure on the protective window is not a factor. Furthermore, when the lens within a system is intended to be cooled by assist gas the placement of a protective window in front of the lens blocks the assist gas from cooling the lens. As higher laser powers are increasingly employed in the industry, lenses are subjected to more energy which generates increased heat and the effect of heat on focusing lenses has become a matter of increasing concern.

Since most cutting lasers operate at high pressure at least part of the time, a means must be devised to deal with the pressure to make use of protective windows practical in cutting applications. Merely making room for the protective window in the lens mounting system does not deal with the pressure. Furthermore, inserting a protective window can interfere with assist gas cooling of the focusing lens.

As indicated above, the typical protective window used in a $CO_2$ laser is a crystal material made of NaCl or KCl. These window materials are economical and they will transmit 90% or more of the available energy in a $CO_2$ laser system without an expensive anti-reflective coating, but these materials will not withstand the high pressure generated by assist gases during cutting operations.

As noted above, there are no $CO_2$ laser cutting systems on the market made by any major laser manufacturer that accommodate protective windows. The employment of a method or apparatus that allows a protective window to operate in a pressure neutral environment or is otherwise protected from assist gas pressure is constrained by the geometry and other design features of industrial lasers in which it is desirable to employ a protective window. Certain laser systems employ lens mounting configurations which do not leave enough room to employ means for use of protective windows in the presence of high assist gas pressures, and other laser systems employ proprietary designs incorporating features such as automatic focusing that make it impractical to alter or add to the manufacturer's lens mount design. According to a recent survey published by Industrial Laser Review, there are many thousands of industrial laser welding and cutting systems in the field and 1200 new cutting systems are being sold annually. Since none of the laser systems mentioned provide means for use of protective windows and since the cost of replacing damaged focusing lenses in such systems is material, it would be a significant advance in the art to provide a method and device for protecting focusing lenses in such laser systems from spatter through the use of protective windows which can accommodate high assist gas pressures and provide for the proper cooling of the focusing lenses.

Apparatus for holding protective windows in front of laser focusing lens is known in the art. Cosmescu (U.S. Pat. No. 5,312,397) and Diakuzno (U.S. Pat. No. 4,592,353) disclose devices intended to protect the optics of lasers employed in surgical processes from blood and body fluids that would impair their operation during procedures such as laser laparoscopy. These devices are employed in systems which are entirely different than industrial $CO_2$ laser cutting systems. The devices disclosed by Cosmescu and Diakuzno are used in low power lasers. The device disclosed by Diakuzno relates to fiber optic systems for Nd: YAG and Argon lasers, not high power industrial lasers such as $CO_2$ lasers.

More important, the blood and body fluids that foul the optics in a surgical procedure are considerably different from such substances as molten metals and molten plastics that attack the optics in a $CO_2$ laser cutting system. The latter are mostly solids which do permanent damage by adhering to the lens or burning and pitting the lens, whereas the former are mostly water and can be wiped off. The economical protective windows that are practical to use for $CO_2$ cutting lasers, such as NaCl and KCl, could not be used in surgery because they are water soluble; whereas in a surgical procedure an expensive insoluble crystal such as sapphire can be used and reused as a protective window. It would not be practical to use sapphire in a cutting laser because it is considerably more costly than NaCl and KCl. In fact, sapphire is just as costly as Zinc Selenide (ZnSe), the material from which focusing lenses are made. It makes no economic sense to sacrifice a sapphire protective window for a ZnSe lens in an industrial laser. Although a sapphire protective window could be cleaned and reused in the surgical setting, it would be quickly destroyed in an industrial cutting or welding setting. Furthermore, Sapphire is not a useful transmitter of laser at 10.6 microns, which is the wavelength at which $CO_2$ lasers operate.

Another significant difference between high power $CO_2$ laser cutting systems and the low power surgical laser systems in which the devices disclosed by the prior art are intended to be used, is the use of assist gas at pressures of 30 psig or higher to cut stainless steel and other substances in the $CO_2$ laser cutting systems. High pressure assist gas is not used to cut human tissue during surgery. The high pressure assist gas used in $CO_2$ laser cutting systems is not addressed by Cosmescu or Diakuzno. The use of inexpensive materials as protective windows in $CO_2$ laser cutting systems requires use of a method of employing an optical mounting device or an apparatus that neutralizes assist gas pressure to provide support for the protective window such as the method and apparatus of the present invention. Furthermore, if a protective window blocks the assist gas which is intended to be a means of cooling the focusing lens, then alternative means must be adopted to allow the assist gas to cool the lens as well as the protective window.

Finally, the devices disclosed in the prior art are intended to be incorporated into systems and apparatus that are designed to accommodate protective windows whereas one aspect of the present invention concerns the retrofitting of protective windows into existing systems as well as those incorporated into new designs.

SUMMARY OF THE INVENTION

The present invention is directed to a protective window assembly and to its use with or integral with a focusing lens assembly in a laser beam generating apparatus in which the focusing lens is protected by the protective window contained within the protective window assembly. The protective window assembly is either releasably secured to the focusing lens assembly containing the focusing lens or integral therewith. When the focusing lens assembly and the protective window assembly are secured together the focusing lens is effectively protected from contamination in a cost efficient and effective manner. Replacement or renewal of the protective window can often be accomplished without altering or disassembling the focusing lens assembly.

In one aspect of the present invention there is provided a protective window assembly alone which can be releasably secured to or is integral with a focusing lens assembly for use with a laser beam generating apparatus. The protective window assembly comprises:

(a) a housing having a cavity for securing a protective window therein; and (b) securing means for securing the housing to a focusing lens assembly containing a focusing lens.

In another aspect of the invention, the housing for securing the protective window is releasably securable to a focusing lens assembly. In an alternative embodiment of the invention, the protective window assembly is integral with the focusing lens assembly.

In a preferred aspect of the present invention, the protective window assembly housing allows the passage of gas therethrough to equalize pressure about the protective window to thereby prevent rupture or breakage of the protective window.

In a preferred embodiment of the invention, the protective window assembly or the drilled window (see below) contains a sufficient number of holes serving as gas passageways of sufficient size and operatively located to permit enough gas flow to allow the assist gas within the system in which the protective window is used to cool the focusing lens.

In another embodiment the protective window is protected from breaking under pressure by placing it directly against the flat (piano) surface of the focusing lens so that a large portion of the piano surface of the barrier or window is in contact with a large portion of the piano surface of the lens, thereby significantly increasing the strength of the protective barrier or window because of the additional support provided by the focusing lens. In a preferred embodiment of the invention, a sufficient number of holes are drilled in the protective window to allow the high pressure assist gas to pass through the window to equalize pressure and to cool the focusing lens and either (i) a small spacer is placed on the work side of the lens between it and the protective window to create a hollow cavity or (ii) a flange is placed in the lens mount which is integral to the mount and performs the same function as the spacer. In both embodiments, the protective window or the protective window and the spacer (or flange) can be accommodated within an existing system in the same cavity within which the lens is situated by making additional room by means of (i) elongating or deepening the existing cavity, (ii) substituting a thinner focusing lens with the same focal length as is used in the lens previously employed, (iii) reducing the size of one or more components that secure the lens such as springs or retaining screws, (iv) moving the focusing lens where there is sufficient capacity in the system to adjust the focus so that the focal point of the laser beam is not altered or where a longer focal length lens is substituted, or (v) a combination of the steps described in (i) to (iv).

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 12 shows a cross section of a preferred embodiment of the present invention being a lens mount of the type shown in FIG. 11 with means to employ a protective window;

FIG. 13 shows a three dimensional exploded view of the internal component parts of the lens mount shown in FIG. 12;

DETAILED DESCRIPTION OF THE INVENTION

Figure 2:
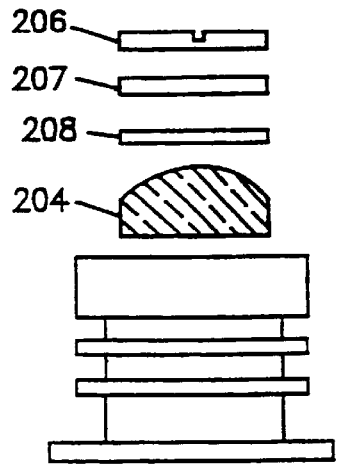
FIG. 2 shows an exploded view of the component parts of a lens mount of the type shown in FIG. 1.

The present invention is directed to a protective window assembly and to its use for protecting a focusing lens from spatter while also protecting the protective window against high gas pressure and allowing the focusing lens to be properly cooled. The protective window assembly employed in the present invention protects the protective window against breakage while protecting the focusing lens against contamination and provides such protection in a cost efficient and effective manner. The protective window assembly may be employed alone or may be combined as either a removable or integral part of a focusing lens assembly which can be inserted into a laser beam generating apparatus.

Gases (e.g. nitrogen) under high pressure are used to assist in the laser operation. The assist gas provides an atmosphere superior to shop air to enhance the cutting action and, as described previously, to also blow away spatter from the focusing lens. Under some circumstances such as in the cutting of stainless steel, the pressure of the assist gases can be very high (e.g. 150 to 300 psig). High pressure gas can break or rupture the window which is used to protect the lens.

High power laser cutting systems frequently use assist gases to cool the focusing lens of the system. When a protective window is used to protect the focusing lens from spatter, the protective window blocks the assist gas from reaching the lens. This can cause the lens to overheat, which can cause distortion of the lens and can even melt the lens. In accordance with a preferred embodiment of the present invention there is provided an embodiment wherein the high gas pressures around the protective window are neutralized and means for cooling of the lens with the aid of the assist gas while also employing a protective window to protect the lens from spatter damage.

The elasticity of NaCl and KCl and other materials that are economically practical to use as barriers to protect focusing lenses in industrial lasers is lower than that of materials used for $CO_2$ laser focusing lenses such as zinc selenide (ZnSe). If ZnSe is used as a protective window, relatively thin windows must be used to make use of that relatively expensive material economically feasible for a protective window application, and such thinner windows can also be more readily ruptured or distorted by high assist gas pressure. The focusing lenses that are used in $CO_2$ laser systems that are designed for applications such as cutting stainless steel must withstand assist gas pressures in the 300 psig range. The use of such high pressure assist gas is typical only of high power lasers (250 watts or more) used in cutting. Assist gas at high pressure is not found in medical applications of $CO_2$ lasers and the optics in such systems do not have to withstand high pressures. In such higher pressure applications, many barrier materials such as KCl and NaCl and thinner widows of more expensive materials such as ZnSe will break if a method or apparatus dealing with high pressure is not employed. In many systems which employ high assist gas pressure the assist gas is used as a means of cooling the focusing lens.

Most high power $CO_2$ laser systems now on the market for cutting applications are not designed to accept devices that hold windows that protect the focusing lens from spatter and other damage. The size and shape of the cutting heads and lens mounts employed in many of these systems leave little or no room for modifications that permit addition of protective barrier windows. Furthermore, many systems do not allow for the flexibility to materially alter the focusing parameters that were incorporated into the system on the assumption that the position of the focusing lens will not be changed. Therefore, it is almost always necessary to accommodate a mounting system for a protective window or barrier window to the constricting geometry of the components of the laser system that contain either the focusing lens or the mounting device for the focusing lens. Furthermore, this accommodation must almost always be made without changing the position of the focusing lens, because doing so will change the focal point of the laser where the cutting action takes place and many existing laser cutting systems are not designed with sufficient focusing range to permit focusing to correct such a change in focal point. When there is enough room and the shape of the cutting head and lens mount are not unduly constricting, the method and apparatus previously described can be employed.

But, there are many cutting head and lens mount configurations which make it impossible to alter or add to the exterior geometry of the hardware comprising the lens mount or to change the location of the lens due to functional and geometric constraints imposed by the laser cutting systems in which these heads and mounts are employed. These geometric and system constraints are not addressed by the prior art which is directed to low pressure laser systems such as those used for surgery.

The present invention and especially the embodiments which are described hereinafter are directed to a protective window assembly in which the pressure imposed by assist gas used in a laser system is neutralized by means that do not materially alter the exterior dimensions of the focusing lens mounting hardware. This is accomplished by means of either pressing the flat surface of the protective window against the flat surface of the focusing lens in those systems in which a piano convex lens is employed or, in a preferred embodiment, by using a protective window which is drilled with holes and sufficient size, number and location to allow assist gas to flow into a cavity between the focusing lens and the protective window so that the pressure equalizes on both sides of the protective window. This can also be accomplished in another preferred embodiment of the invention, the protective window is mounted within the external geometry of the lens mount by inserting a window holder with gas passing means inside of the lens mount by means such as those shown in FIGS. 14 and 15. In yet another preferred embodiment of the invention, the protective window assembly with gas passing means or the drilled window will contain a sufficient number of holes of sufficient size located to permit enough gas flow to allow the assist gas within the system in which the protective window is used to cool the focusing lens.

Use of gas passing means can allow the assist gas to continue to cool the lens and the protective window, but to cool the lens the gas passing means must be sufficient to allow circulation of the assist gas so that the heat from the lens is carried away by the assist gas. With higher powered lasers, gas passing means that are adequate for equalizing the pressure on both sides of the window to keep it from breaking can be inadequate for cooling the lens. Accordingly, when the method of producing gas passing means is to place holes in the protective window or in the assembly which holds the window, it is necessary to assure that the number of holes and the size of the holes is sufficiently large and properly located to allow for a rate of circulation of the assist gas that will carry heat away from the lens and the rear surface of the protective window and thereby aid in cooling these optics. Thus, while a lesser number of holes may be adequate to act as gas passing means for pressure equalization, larger diameter holes or a greater number of holes may be required for cooling the optics. Furthermore, it may be desirable when the gas passing means is holes drilled in the optic to drill the holes closer to the center to allow for cooling. For example, it may be adequate to place one hole in an optic to allow sufficient pressure to pass through the window to allow for pressure equalization but more holes will be required to cool the optic. Similarly, where the gas passing means is holes drilled in an assembly in which the protective window or the focusing lens is mounted, the same considerations apply except, of course, that it will not be possible to drill holes as close to the center of the optic as can be done with gas passing means of drilling holes in the optic but gas can be directed towards the center of the lens. It should also be understood that cooling the lens may require, in another preferred embodiment of the invention, that holes be drilled in both the protective window and in a component of the assembly in which the focusing lens or the protective window is mounted.

In one preferred embodiment of the invention employing a drilled window, the cavity between the focusing lens and the protective window is created by means of inserting a small cylindrical spacer (e.g. about 1 mm to 2 mm thick and 1 mm to 2 mm wide) between the lens and the protective window.

In another preferred embodiment of the invention employing a drilled window, the spacer is replaced by a small flange located on the inside diameter of the cylindrical portion of the lens mount on which the work side (cutting side) of the lens seats as a means of creating a cavity between the lens and the protective window. The protective window seats on the opposite side of the same flange or spacer. The use of a flange instead of a spacer has the advantage of being both means of creating a cavity between the lens and the protective window for purposes of neutralizing the pressure on the protective window and means of positively locating the lens so that the focal length cannot be altered. Such a flange has the advantage of positively locating the lens in those systems where the lens is not seated on its upper (typically convex) surface.

In all embodiments of this aspect of the present invention sufficient room is made to mount the protective window and to accommodate the spacer or flange used to create a cavity by means of:

(a) reducing the size (thickness) of the various components of the lens mounting assembly, such as, but not limited to (i) the lens, (ii) the spring, (iii) the retaining screw, (iv) any segment of the lens mount which can be shortened; (b) removing non-essential components such as spacers and wave springs; and (c) moving the lens back away from the work end (cutting end) by a small distance which does not exceed the focusing capability of the system or which can be compensated for with a lens with a longer focal length.

Figure 1:
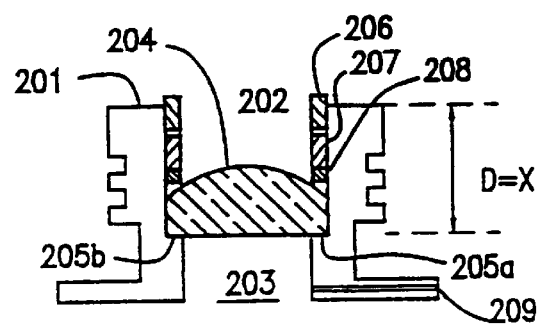
FIG. 1 shows a cross section of the component parts of a lens mount of the type typically used in certain $CO_2$ laser systems to mount the focusing lens, wherein there is limited scope to enlarge the apparatus to accommodate a protective window and to also accommodate the high pressure within the system in a way that will prevent breakage of the protective window.

FIG. 1 shows a cross section of a type of lens mount similar to the type used by Mitsubishi to mount a focusing lens in certain Mitsubishi $CO_2$ industrial laser systems. The lens mount comprises a hollow cylindrical assembly 201 with an opening at each end 202, 203 in which the focusing lens 204 is seated on a flange 205a, 205b and secured in place by a retaining screw 206, spacer 207 and an "O" ring 208 so that the convex surface of the lens is at the laser (upper) end 202 of the assembly 201. The assist gas enters through holes 209 that are drilled around the circumference of the work end 203 of the cylindrical chamber in the assembly. The distance between the flange 205a, 205b on which the lens rests and the top of the assembly is represented by D=X.

FIG. 2 shows an exploded view of the internal components of FIG. 1 being a retaining screw 206 of the type that can be opened by use of a spanner wrench, a spacer 207, an "O" ring or gasket 208, and a focusing lens 204 which seats on the flange shown as 205a, 205b in FIG. 1.

Figure 3:
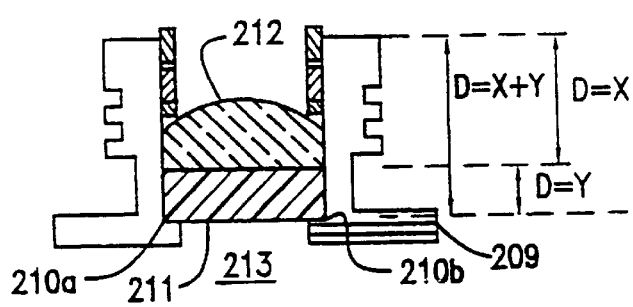
FIG. 3 shows a cross section of a preferred embodiment of the present invention being a lens mount of the type shown in FIG. 2 with means to employ a protective window.

FIG. 3 shows a cross section of a preferred embodiment of the present invention which is a lens mount which can be produced as a replacement for a lens mount of the type shown in FIG. 1. In this preferred embodiment the flange 210a, 210b has been bored deeper than the flange shown as 205a, 205b in FIG. 1 to accept a protective window 211. When this preferred embodiment of the invention is produced as a replacement for a lens mount of the style shown in FIG. 1, the invention has the same external geometry and dimensions and the location and size of the focusing lens are not altered by the modifications or the differences between the internal geometry of the invention and of the lens mount in the style of FIG. 1. A protective window 211 situated in the internal cylindrical chamber of the lens mount is pressed against the piano (flat) surface of a piano convex lens 212 as a means to provide enough support for the protective window 211 to prevent it from breaking when exposed to high pressure from assist gas introduced through the holes 209 around the circumference of the work end of the internal cylindrical cavity or chamber 213 of the assembly. It is understood that a drilled protective window could be used in such preferred embodiment to permit assist gas to cool the focusing lens. The protective window completely fills the work end of the cylindrical chamber 213 so that any spatter from the work will be blocked from coming into contact with the focusing lens 212. The incremental depth of the internal chamber extending the point where the flange is situated towards the work end of the chamber, which is required to accommodate the protective window, is represented by the expression "D=Y". Y is also the thickness of the protective window. The overall depth of the chamber with the protective window in place is represented by the expression "D=X+Y", with D being the sum of the distance (X) shown in FIG. 1 and the incremental space (Y) required to accommodate the protective window in a lens mount which has the same external geometry as that of the lens mount shown in FIG. 1.

Figure 4:
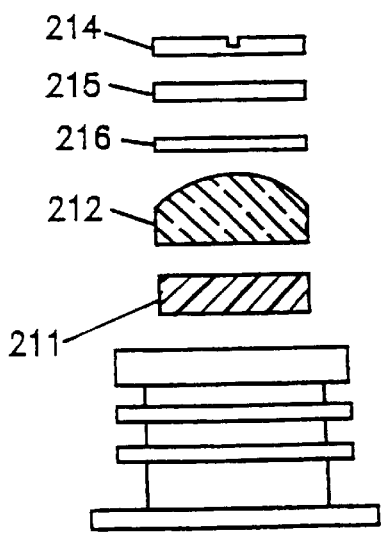
FIG. 4 shows an exploded view of the component parts of the lens mount shown in FIG. 3.

FIG. 4 shows an exploded view of the internal components of FIG. 3, being a retaining screw 214 of the type that can be opened by use of a spanner wrench, a spacer 215, an "O" ring or gasket 216, and a focusing lens 212 which seats on the protective window 211. The protective window seats on the flange 210a, 210b shown in FIG. 3.

Figures 5, 6:
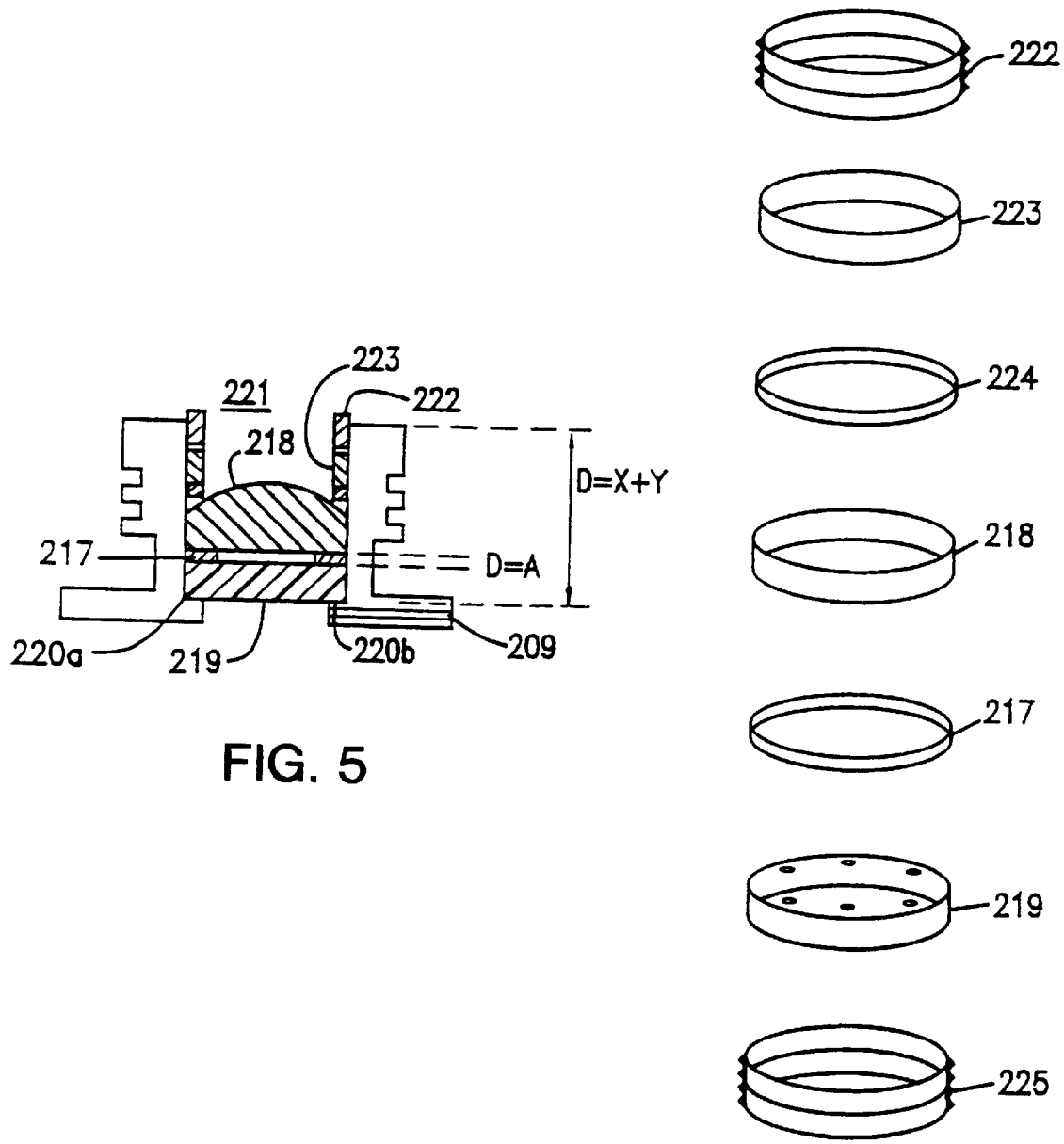
FIG. 5 shows a cross section of another embodiment of the present invention, being a lens mount of the type shown in FIG. 4 with alternate means of employing a protective window.
FIG. 6 shows a three dimensional exploded view of the interior components of the lens mount shown in FIG. 5 and an optional lower retaining screw.

FIG. 5 shows a cross section of another preferred embodiment of the present invention which is a lens mount which can be used as a replacement for a lens mount of the type shown in FIG. 1. The flange 220a, 220b has been bored deep enough to accept a protective window 219 and a spacer or internal flange 217. The preferred embodiment of the invention shown in FIG. 5 can be produced to have the same external geometry and dimensions as lens mounts of the type shown in FIG. 1 and the focal length of the focusing lens 218 can be produced so it is the same as that in the type of lens mount shown in FIG. 1 even though a thinner lens may be used. A protective window 219 in which holes have been drilled is situated in the internal cylindrical chamber of the lens mount in a manner that is intended to form a cavity between the protective window 219 and the work (piano) end of the lens 218. The protective window 219 completely fills the work end of the cylindrical chamber so that any spatter from the work will be blocked from coming into contact with the focusing lens 218. The drilling of the protective window 219 allows assist gas to pass into the cavity created by the spacer or internal flange 217, thereby allowing the pressure to equalize both in front of the window 219 and behind the window in space within the cavity. This creates a pressure neutral environment for the window 219. The cavity is formed by a spacer or internal flange 217 situated between the work end of the lens and the window. It is understood that in a preferred embodiment of the invention, holes of sufficient number and size could be drilled at appropriate locations in the protective window to allow assist gas to be employed as means to cool the focusing lens and the window.

The thickness of the spacer or internal flange is "A" represented by the expression "D=A". In this representation of the preferred embodiment the overall depth (D) of the chamber is the same as in the other preferred embodiment shown in FIG. 3 viz X+Y, and is represented by the expression "D=X+Y". In this preferred embodiment the space taken up by the additional component not used in the embodiment shown in FIG. 3, which is the spacer of flange 217 separating the lens 218 and the protective window 219, is also represented by the expression "D=A". The requisite space (A) to accommodate the spacer or flange 217 is provided by making the lens thinner by "A", which is the same distance that was required to accommodate the spacer of flange 217. But, it is understood that all or part of the space required to accommodate the spacer and the protective window can be provided by making the protective window thinner by the distance "A" or by making both the protective window and the lens thinner. It is further understood that additional room could be made to accommodate the spacer or the protective window by moving the lens back towards the top of the cavity 221 in the lens mount and making one or more of the components such as the retaining screw 222 or the spacer 223 thinner, provided that the focal length of the lens was changed or that the system had sufficient focusing capability. It is further understood that when a spacer or internal flange is added to separate the protective window and the lens, that the lens may be of a different geometry than piano convex as a flat side is no longer required to support the protective window for the purpose of preventing it from breaking under pressure.

In this embodiment of the invention it is not necessary for the protective window to touch the lens to provide a means of preventing the window from breaking under the pressure applied by the assist gas, which makes this embodiment practical to use with focusing lenses that do not have a flat (piano) surface that will support the window, such as meniscus and diffractive lenses. It is also understood that the spacer could be eliminated between the lens 218 and the drilled protective window 219 if the work end surface of the lens is sufficiently concave to form a cavity in which the assist pressure can equalize. It is understood that in a preferred embodiment of the invention holes of sufficient number and size could be drilled in the protective window to allow assist gas to be employed as means to cool the focusing lens and the window.

FIG. 6 shows an exploded three dimensional view of internal components of the preferred embodiment of the present invention shown in FIG. 5, with the addition of an optional work end retaining screw 225. Such internal components are a retaining screw 222, a spacer 223, an "O" ring 224, a focusing lens 218, a spacer or internal flange 217, and a drilled protective window 219. It is understood that if an internal flange is used in place of a spacer, then it would be integral with the wall of the cylindrical internal chamber of the assembly shown in FIG. 5 and not a separate component. Such an internal flange 217 could be used in conjunction with a lower or work end retaining screw 225. The advantage of an internal flange 217 integral with the internal wall of the assembly chamber is that such a flange positively locates the lens and prevents accidental minor changes in the focal point of the laser beam. The use of a work end retaining screw assumes that the flange 220a, 220b shown in FIG. 5 on which the lens seats as shown in FIG. 5 will be removed and that the inside diameter of the cylindrical chamber of the assembly will be threaded (not shown) with a female thread (not shown) that will match a male thread on the retaining screw 225. Another advantage of using an optional work end retaining screw 225 coupled with an internal flange 217 is that the protective window can be removed independently of the focusing lens simply by removing the retaining screw from the work end of the assembly while the lens remains undisturbed, thereby avoiding damage to the lens or the coating on the lens from mishandling when protective windows are replaced. Use of a working end retaining screw may require use of means (not shown) to allow assist gas to pass through or above the retaining screw, such as holes or slots.

Figure 7:
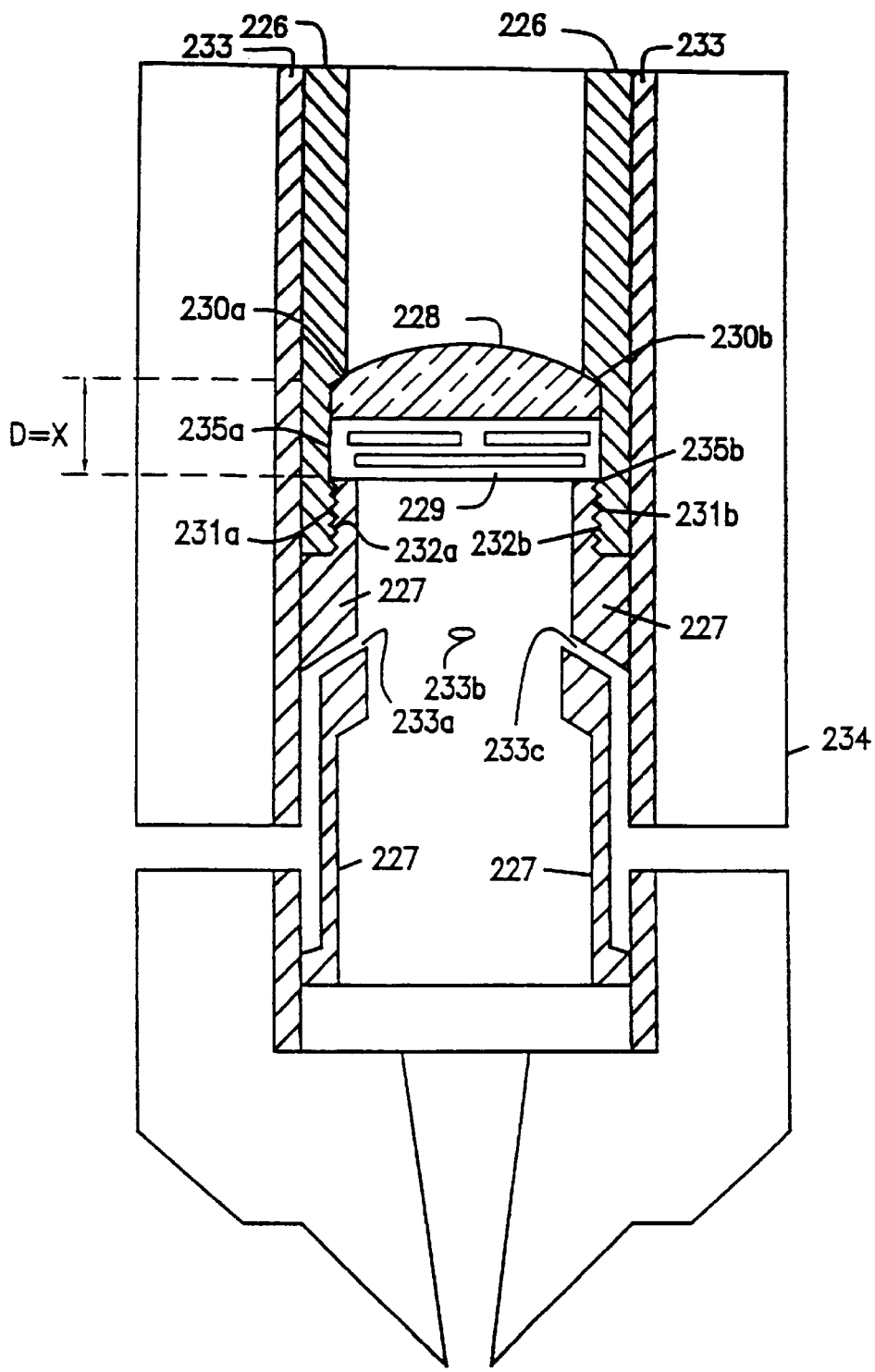
FIG. 7 shows a cross section of the component parts of a lens mount of the type typically used in certain $CO_2$ laser systems.

FIG. 7 shows a cross section of a lens mount of the type typically used by Trumpf to mount a focusing lens in the head of a $CO_2$ laser. The assembly comprising the lens mount contains two major components 226, 227 which screw together and compress the lens 228 and a spring 229 between them. The larger of the major components 226 has a flange or shoulder 230A, 230B on which the convex side of the lens seats and also contains a female thread 231A, 231B which mates with male thread 232A, 232B of the other major component 227. The lens mount assembly contains holes 233A, 233B, 233C which direct the assist gas towards the lens to cool it and to drive away spatter. A spring 229 is situated beneath the focusing lens 228 to allow for thermal expansion of the lens and to prevent damage by accidental excessive tightening. The spring and the lens are held in place by the flange or shoulder 235a, 235b created by the top of the lower section of the lens mount 227 and the flange on which the convex surface of the lens seats 230a, 230b. Because the geometry of this style of lens mount is complex and the lens mount is closely confined within a cylinder or tube 233 within the cutting head 234, it is impossible to add to the lens mount assembly or to change its external geometry without redesigning the entire cutting head and any modification to the lens mounting assembly that would allow the assist gas to flow into a cavity behind the protective window while not blocking the laser and while maintaining the same focal length would be either impossible or extremely complex and expensive to execute.

Figure 8:
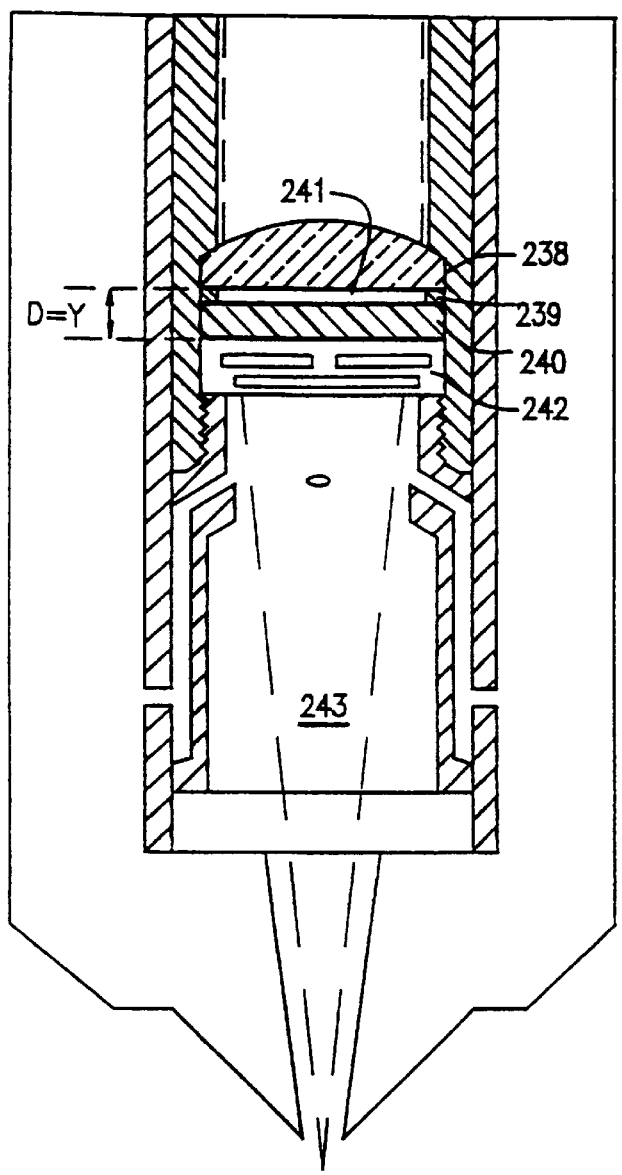
FIG. 8 shows a cross section of another embodiment of the present invention, being a lens mount of the type shown in FIG. 7 with means of employing a protective window.

FIG. 8 shows a cross section of another preferred embodiment of the present invention being a lens mounting assembly with same external geometry as the type of lens mounts shown in FIG. 7. This preferred embodiment of the invention can be produced so that the focusing lens remains in the same position as it is in FIG. 7 so as not to alter the focal point of the laser beam when the invention is used as a replacement lens mount for a lens mount of the type shown in FIG. 7. A spacer or flange 239 is located between the focusing lens 238 and a drilled protective window 240 in the assembly to form a cavity 241 between the lens 238 and the drilled protective window 240 into which pressurized assist gas can flow. The protective window 240 completely fills the work end of the cylindrical chamber 243 so that any spatter from the work will be blocked from coming into contact with the focusing lens 238. The drilling of the protective window 240 allows assist gas to pass into the cavity 241 created by the spacer or internal flange 239 which allows the pressure to equalize both in front of the window 240 and behind the window 240 in space within the cavity 241 and thereby creates a pressure neutral environment for the window 240. The cavity is formed by a spacer or internal flange 239 situated between the work end of the lens and the window. It is understood that in a preferred embodiment of the invention, holes of sufficient number and size could be drilled at appropriate locations in the protective window to allow gas to be employed as means to cool the focusing lens and the window.

It is understood that this embodiment of the invention may be used as a replacement for a pre-existing lens mount of the type shown in FIG. 7, in which event the space occupied by the spacer or flange 239 and the protective window 240 (represented by the expression D=Y) is accommodated by shortening the work end of the lens mount 227 by a distance equal to "y".

In this embodiment of the invention it is not necessary for the protective window to touch the lens to provide a means of preventing the window from breaking under the pressure applied by the assist gas, which makes this embodiment practical to use with focusing lenses that do not have a flat (piano) surface that will support the window, such as meniscus and diffractive lenses. It is also understood that the spacer or flange 239 could be eliminated between the lens 238 and the drilled protective window 240 if the work end surface of the lens is sufficiently concave to form a cavity in which the assist pressure can equalize.

Figure 9:
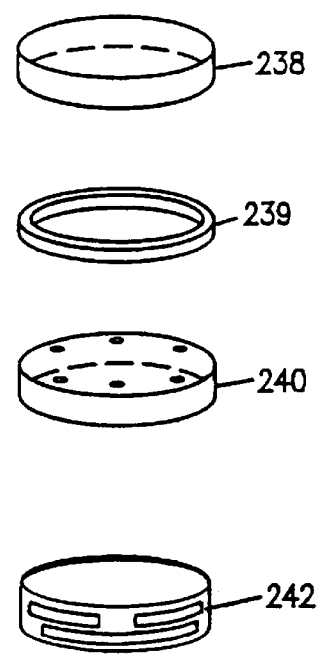
FIG. 9 shows a three dimensional exploded view of the internal component parts of the lens mount shown in FIG. 8.

FIG. 9 shows an exploded three dimensional view of the internal components of the preferred embodiment of the invention shown in FIG. 8, being a focusing lens 238, a spacer or flange 239, a drilled protective window 240 and a spring 242.

Figure 10:
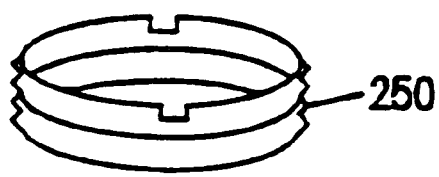
FIG. 10 shows a three dimensional exploded view of a preferred embodiment of the present invention wherein means are employed to accommodate a protective window.
Figure 10:
Figure 10:
Figure 10:
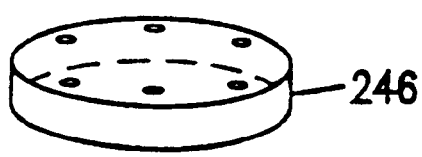
Figure 10:
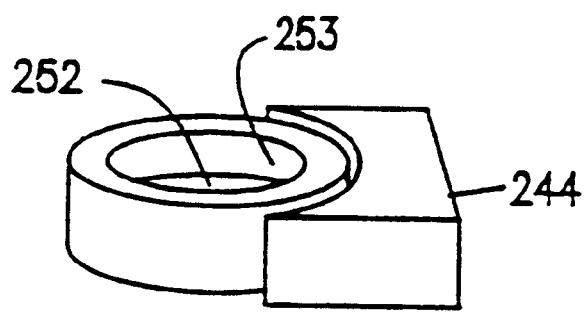
Figure 10:
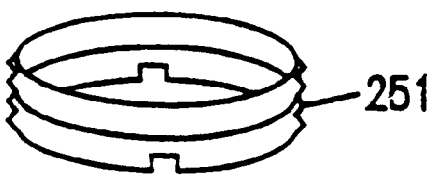

FIG. 10 shows a three dimensional exploded view of another preferred embodiment of the invention in which a drilled protective window 246 is mounted in a drawer style lens mount assembly 244 which can be produced with the same external geometry as lens mounts manufactured by Laser Mechanisms, Inc. and others, which are used in several laser systems including the Cincinnati, Strippit and Laser Cut brands, for the purpose of using the invention as a replacement for such types of lens mounts. In the preferred embodiment of the invention shown, a drilled protective window 246 is situated in front of the focusing lens 249 so that the protective window blocks the entire aperture of the cylindrical cavity 252 in which the focusing lens 249 is mounted. It is understood that if this preferred embodiment of the invention is to be used for a replacement of the drawer type mount made by Laser Mechanisms, Inc. or others, then it must slide into an aperture in the cutting head (not shown) of an existing laser system which is substantially the same size and shape as the lens mount and that it would require an impractical modification of the cutting head to accommodate a larger or different shape lens mount. In the preferred embodiment of the invention shown, the room required to accommodate the protective window 246 when the invention is used as a replacement lens mount in an existing laser system is created without altering the external geometry of the lens mount by such means as: (i) using a thinner focusing lens 249 than would normally be used in the OEM design, (ii) moving the lens back from the work 1 to 2 mm by means of shortening the retaining screw 250 by 1 to 2 mm, and (iii) moving the spacer 248 from a location at the front of the work end of the assembly to a position under the focusing lens 249 between the protective window 246 and the lens 249 or replacing such spacer 248 with a smaller spacer located between the protective window 246 and the lens 249 or eliminating the spacer in certain cases (see below). It is understood that if the focusing lens is moved the focal length will be changed and to compensate a focusing lens with a longer focal length must be used if the system does not have sufficient focusing capability to compensate for the change in focal length.

The spacer 248 is placed between the focusing lens 249 and the drilled protective window 246 to form a cavity between the lens 249 and the drilled protective window 246 into which pressurized assist gas can flow. Drilling of the protective window 246 allows assist gas to pass into the cavity created by the spacer 248 or an optional internal flange (not shown) which allows the pressure to equalize both in front of and behind the window 246 and thereby creates a pressure neutral environment for the window 246. At the work end of the cylindrical cavity 252 of the lens mount is a flange 253 on which the protective window seats. In an alternative configuration of this embodiment of the invention, a work end retaining screw 251 can be substituted for the flange 253 to allow removal of the protective window without handling the focusing lens so as to prevent accidental damage to the focusing lens from mishandling.

In this embodiment of the invention it is not necessary for the protective window to touch the lens to provide a means of preventing the window from breaking under the pressure applied by the assist gas, which makes this embodiment practical to use with focusing lenses that do not have flat (piano) surfaces that will support the window, such as meniscus and diffractive lenses. It is understood, however, that in another embodiment of the invention (not shown) a protective window can be placed in contact with the flat surface of the piano convex lens to provide support for the protective window in the same manner as is shown in FIG. 3. It is also understood that the spacer or flange 248 could be eliminated between the lens 249 and the drilled protective window 246 if the work end surface of the lens is sufficiently concave to form a cavity in which the assist pressure can equalize.

Figure 11:
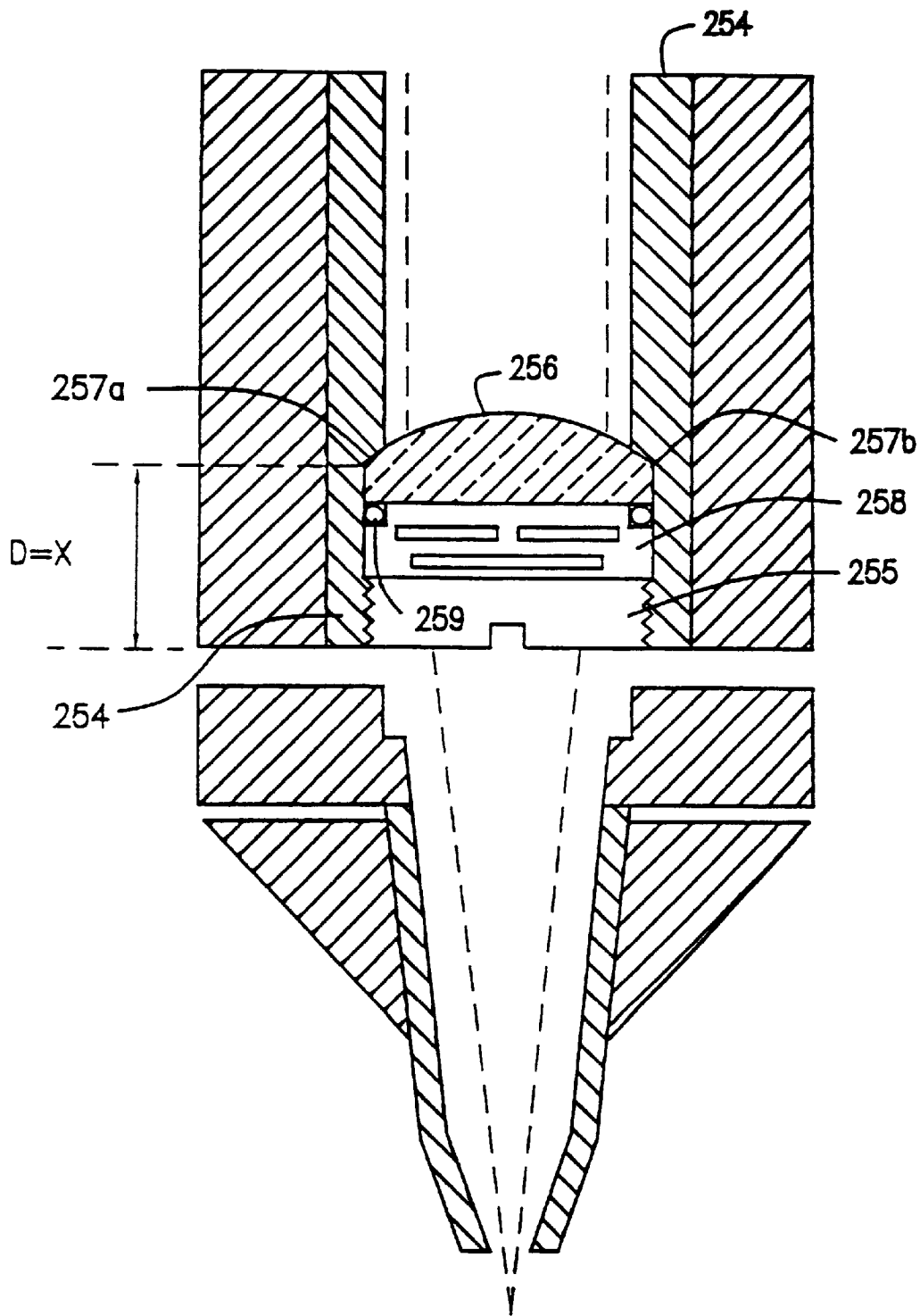
FIG. 11 shows a cross section of the component parts of a lens mount of the type typically used in certain $CO_2$ laser systems to mount the focusing lens.

FIG. 11 shows a cross section of a tubular lens mount typical of the type used by Bystronic and others for focusing lenses in laser cutting systems, which is similar to the tubular lens mount design shown in FIG. 7, except that in FIG. 7 the tube has two major components which screw together whereas the tubular design in FIG. 11 is a single internally threaded tube 254 into which a retaining screw 255 with a male thread is inserted to retain the focusing lens 256 in position within the tube 254. Tubes can be of various lengths to accommodate different focal lengths and cutting head designs, it being understood that if the lens assembly is recessed in the tube the use of a spanner wrench on an extension handle is required to remove the optics by unscrewing the retaining screw 255. The focusing lens 256 is mounted inside the tube 254 with the lens 256 seated on a flange or shoulder in the tube 257a, 257b. The focusing lens 256 is held in place by an assembly consisting of a spring 258 with an "O" ring 259 mounted in a groove or channel within the spring at the interface of the spring with the lower (work end) surface of the lens 256, which assembly is secured within the tube by a retaining screw 255 with a male thread which screws into the tube 254. The space consumed by the assembly 255, 256, 258, 259 is represented by the expression D=X.

FIG. 12 shows a cross section of another preferred embodiment of the present invention being a lens mounting system which can be produced with the same external geometry as the type of lens mount shown in FIG. 11 for the purpose of using the invention as a replacement for lens mounts of such type. When this preferred embodiment of the invention is used as a replacement lens mount in an existing system, the focusing lens 260 is located in the same position as the focusing lens 256 in the lens mount shown FIG. 11 so as not to alter the focal point of the laser beam. A spacer or flange 261 is located between the focusing lens 260 and a drilled protective window 262 in the assembly to form a cavity 263 between the lens 260 and the drilled protective window 262 into which pressurized assist gas can flow. The protective window 262 completely fills the work end of the cylindrical chamber 264 so that any spatter from the work will be blocked from coming into contact with the focusing lens 260. The drilling of the protective window 262 allows assist gas to pass into the cavity 263 created by the spacer or flange 261 which allows the pressure to equalize both in front of the window 262 and behind the window 262 in space within the cavity 263 and thereby creates a pressure neutral environment for the window 262. The cavity is formed by a spacer or flange 261 situated between the work end of the lens 260 and the window 262.

It is understood that this embodiment of the invention may be used as a replacement for a pre-existing lens mount of the type shown in FIG. 11, in which event the spacer or flange 261, protective window 262, lens 260, "O" ring 265, spring 266 and retaining screw 267 are accommodated within the same space (represented by the expression D=X) that accommodates the lens 256, "O" ring 259, spring 258, and retaining screw 255 in the type of lens mount shown in FIG. 11. The additional space taken up by the protective window 262 and the spacer or flange 261 used in this preferred embodiment of the invention (represented by the expression D=Y) is made available by using a smaller spring 266 and retaining screw 267 than is used in OEM versions of lens mounts of the type shown in FIG. 11. The assembly consisting of the lens 260, spacer 261, protective window 262, "O" ring 265 and spring 266 is held in place by a retaining screw 267 which presses the lens 260 against a shoulder or flange 268a, 268b that forms a part of the tube 269 containing the assembly within the cutting head 270.

In this embodiment of the invention it is not necessary for the protective window to touch the lens to provide a means of preventing the window from breaking under the pressure applied by the assist gas, which makes this embodiment practical to use with focusing lenses that do not have a flat (piano) surface that will support the window, such as meniscus and diffractive lenses. It is understood, however, that in another embodiment of the invention (not shown) a protective window can be placed in contact with the flat surface of a piano convex lens to provide support for the protective window in the same manner as is shown in FIG. 3. It is also understood that the spacer or flange 248 could be eliminated between the lens 249 and the drilled protective window 246 if the work end surface of the lens is sufficiently concave to form a cavity in which the assist gas pressure can equalize. It is understood that in a preferred embodiment of the invention holes of sufficient number and size could be drilled at appropriate locations in the protective window to allow assist gas to be employed as means to cool the focusing lens and the window.

Figure 16A:
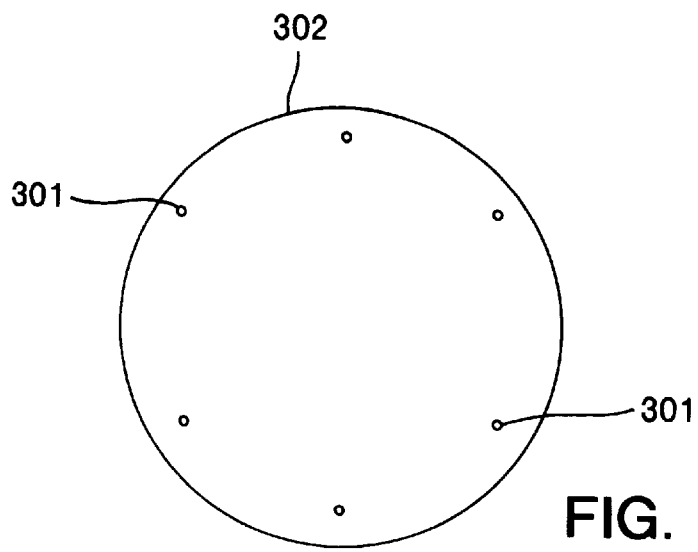
FIG. 16A–16C are plan views of embodiments of protective windows employed in accordance with the present invention.
Figure 16B:
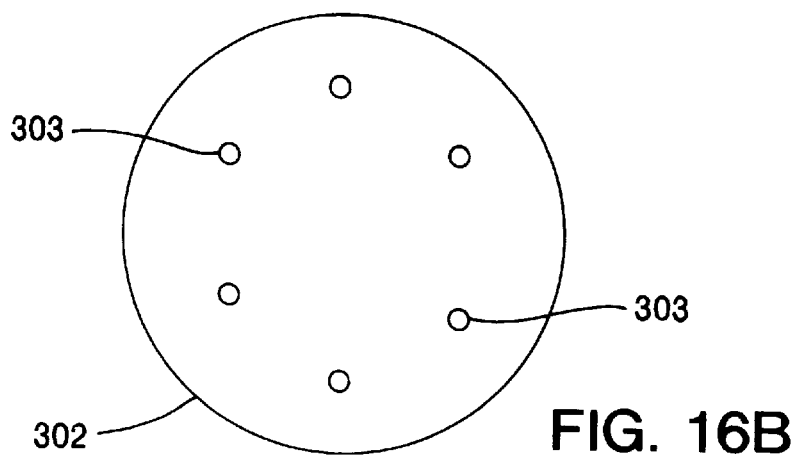
Figure 16C:
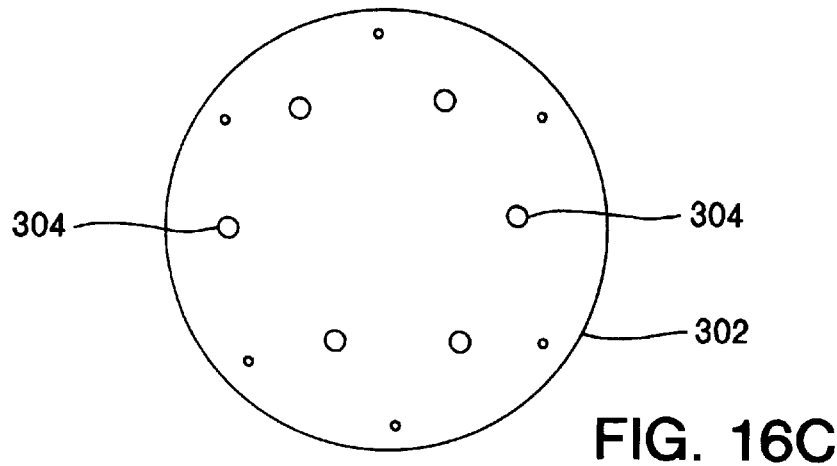

Lens mounting systems such as that shown in FIG. 11 are in use in commercially available laser systems with power ranges from as low as 1500 Watts and to as high as at least 3000 Watts. High power lasers generate more energy and that the focusing lens can absorb, and when the lens absorbs energy the result is heat. Excessive heat can distort or damage the lens, which can be manifested in various ways ranging from distortion of the laser beam spot size or focus to catastrophic failure in which the lens melts. In the case of a 3000 Watt laser with a cutting head similar to that shown in FIG. 11 in which a preferred embodiment of the invention as shown in FIGS. 12 and 13 is used, 6 holes 301 of 1/16" diameter placed around the circumference of the protective window 302 are adequate for gas passing means to equalize the pressure in front of and in the rear of the window, as shown in FIGS. 16A and 13. However, the heat generated by the beam will cause the focusing lens 260 located behind the protective window 262 to distort when this hole configuration is employed if assist gas is the intended means of cooling the lens. When larger diameter holes 303 are added closer to the center of the window 302, the laser can operate at higher power rates, but still not at full power, as shown in FIG. 16B. However, when a second row of larger holes 304 is added to the window 302, the laser will be able to operate at substantially full power without distortion of the lens, as shown in FIG. 16C. It is understood that the larger holes could be closer to the edge of the window with the smaller holes more towards the center or that holes of equal sizes in the appropriate location could achieve the same result, as could a combination of holes in the window and appropriately located holes in the assembly wherein the lens or window is mounted.

Figure 14:
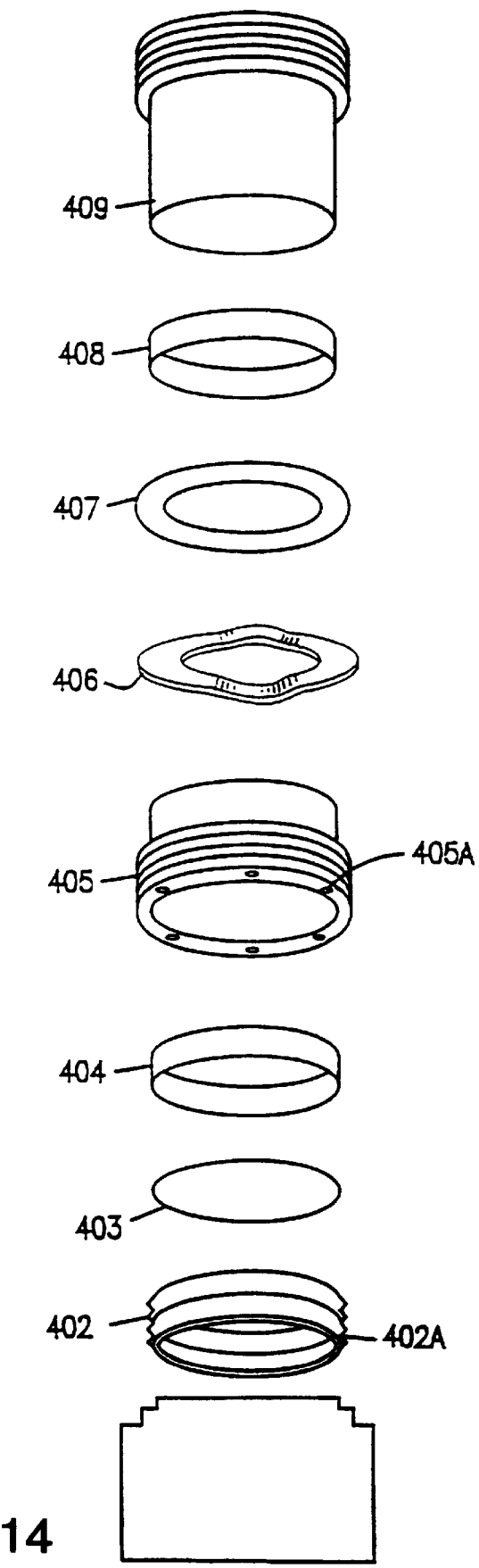
FIG. 14 is an exploded view of another embodiment of a lens mount assembly in accordance with the present invention.
Figure 15:
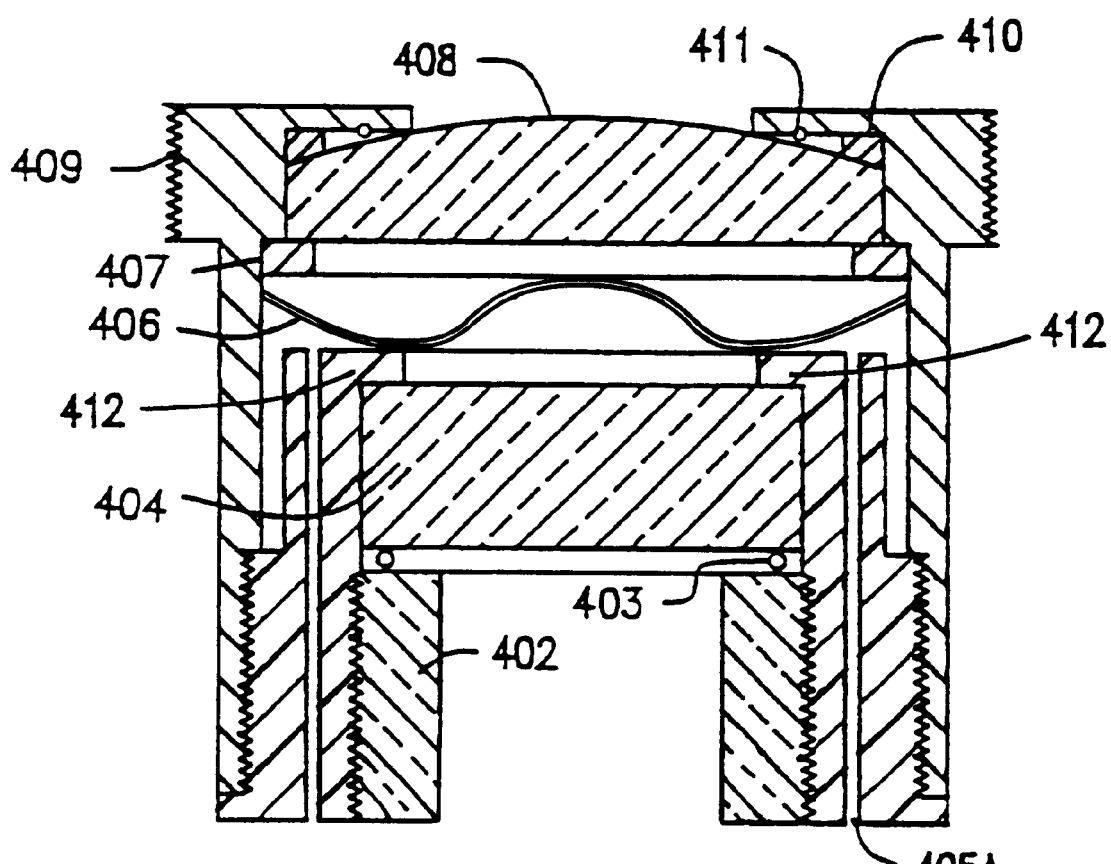
FIG. 15 is a cross-sectional view of the lens mount assembly of FIG. 14 including a protective window.

Referring to FIGS. 14 and 15, the lens mount is an adapter to a Mazak lens mount 409 in which the focusing lens 408 is compressed against a flange 411 by means of a flat spring 406 such as a flat spring 410. The adapter is in the form of two nesting retaining screws 402, 405, one of which 402 has male threads 402A and screws into the female threads (not shown) of the other 405. These two components 402, 405 replace the retaining screw in the lens mount that is supplied by the laser system original equipment manufacturer (OEM). The protective window 404 is inserted from the work end of the lens mount and it sits inside of the larger retaining screw 405 on a flange 412 (shown in FIG. 15) located at the laser end of the retaining screw. The assist gas passes through the holes 405A in the larger retaining screw 405, to allow the assist gas pressure to equalize in the cavity formed between the lens 408 and the protective window 404 which cavity is created by the wave spring 406 and the spacer 407. It is understood that in another embodiment of the invention, the holes could be located in the outer casing of the lens mount 409 or in a radial direction in another component such as a connection device between a protective window mount and the assembly in which the lens is mounted, depending upon the geometry of the assembly. If handled properly, the protective window 404 can be removed and a replacement can be installed without disturbing the focusing lens 408, which limits the amount of refocusing that is required when the protective window 404 is changed.

The protective window 404 is held in place by an inner retaining screw 402 that nests inside of the larger outer retaining screw 405. Between the protective window 404 and the retaining screw is a lose "O" ring 403 which allows the window to expand when heated and cushions the optic when pressure is applied. The outside retaining screw 405 is tightened with firm pressure to hold the focusing lens in place. The rest of the components are then installed.

The holes 405A in the lens mount allow assist gas pressure to bypass the protective window 404. The wave spring 406 must be situated as shown to allow the assist gas to equalize in front of and behind the protective window and which allows an opening for the assist gas to pass through 405A. It is understood that in a preferred embodiment of the invention, holes of sufficient number and size could be drilled in the protective window or in a component of the lens or window mounting assemblies 402, 405, 409 or in both the window and such component to allow assist gas to be employed as means to cool the focusing lens and the window.

What is claimed is:

1. An optical assembly for a laser beam generating apparatus directing a laser beam in a path between a focusing lens and a focal point of the laser beam comprising:
   (a) a housing;
   (b) a protective window assembly comprising a protective window secured within said housing at a position along the path of the laser beam between the focusing lens and the focal point of the laser beam;
   (c) a cavity between said protective window and the focusing lens; and
   (d) means for cooling the focusing lens while equalizing the pressure around said protective window to protect said protective window from damage caused by gas pressure while alleviating an effect of heat on said focusing lens.

2. The optical assembly of claim 1 wherein means for cooling the focusing lens and equalizing pressure around the protective window comprises gas passing means for allowing the gas to pass through or around the protective window assembly.

3. The optical assembly of claim 2 wherein the gas passing means comprises at least one aperture in the protective window assembly or the protective window having a sufficient size and being in a location which enables equalization of gas pressure and cooling of the focusing lens.

4. The optical assembly of claim 2 wherein the gas passing means comprises a plurality of apertures in the protective window assembly or protective window having a sufficient size and having a location which enables equalization of gas pressure and cooling of the focusing lens.

5. The optical assembly of claim 1 wherein means for cooling the focusing lens and equalizing pressure around the protective window comprises gas passing means for allowing the gas to pass through the protective window.

6. A method of protecting a focusing lens of a laser beam generating device comprising the steps of placing a protective window assembly comprising a protective window in proximity to the focusing lens, and passing a gas through or around the protective window assembly in a manner which equalizes gas pressure around the protective window and cools the focusing lens.

7. The method of claim 6 wherein the protective window and focusing lens are separated by a cavity, said method further comprises adjusting a size of the cavity, reducing a thickness of one or more components of a lens assembly containing said focusing lens, reducing a size of a component that secures the lens assembly, adjusting a location of one or more components of the lens assembly or adding a concentric cavity and retaining means to a lens assembly to thereby accommodate at least the protective window.

8. A method of protecting a focusing lens of a laser beam generating device comprising the steps of placing a protective window assembly comprising a protective window in proximity to a lens assembly holding the focusing lens and passing a gas through or around the protective window assembly in a manner which equalizes gas pressure around the protective window and cools the focusing lens.

* * * * *